United States Patent [19]

Schaller

[11] 3,922,032
[45] Nov. 25, 1975

[54] SLIDING ROOF DEVICE WITH A DEFLECTOR
[75] Inventor: Jean-Pierre Schaller, Raynans, France
[73] Assignees: Automobiles Peugeot, Paris; Regie Nationale des Usines Renault, Boulogne-Billancourt, both of France
[22] Filed: Feb. 7, 1975
[21] Appl. No.: 547,950

[30] Foreign Application Priority Data
Feb. 26, 1974  France .............................. 74.06522

[52] U.S. Cl. ............................... 296/137 J; 98/2.14
[51] Int. Cl.² ............................................. B60J 7/22
[58] Field of Search ......... 296/137 J, 137 C, 137 D, 296/137 E, 137 F, 137 R, 91; 98/2.14

[56]  References Cited
UNITED STATES PATENTS
3,874,723  4/1975  Coenen .......................... 296/137 J FOREIGN PATENTS OR APPLICATIONS
980,012  1/1965  United Kingdom .............. 296/137 J Primary Examiner—Robert J. Spar
Assistant Examiner—Donald W. Underwood
Attorney, Agent, or Firm—Burns, Doane, Swecker & Mathis

[57]  ABSTRACT

The deflector is pivoted to a support. A spring biases the deflector to open the angle made between the deflector and support. A lever is connected to the support and biased by a second spring to shift the support to a position corresponding to an operative deflector. The moving part of the roof shifts the lever when the moving roof part is moved to the roof-closing position so as to shift the support and retract the deflector. The front edge of the moving roof part at the same time pivots the deflector and reduces said angle.

The retracted deflector takes up very little room and yet is very stable and effective when operative.

4 Claims, 3 Drawing Figures

U.S. Patent   Nov. 25, 1975   3,922,032
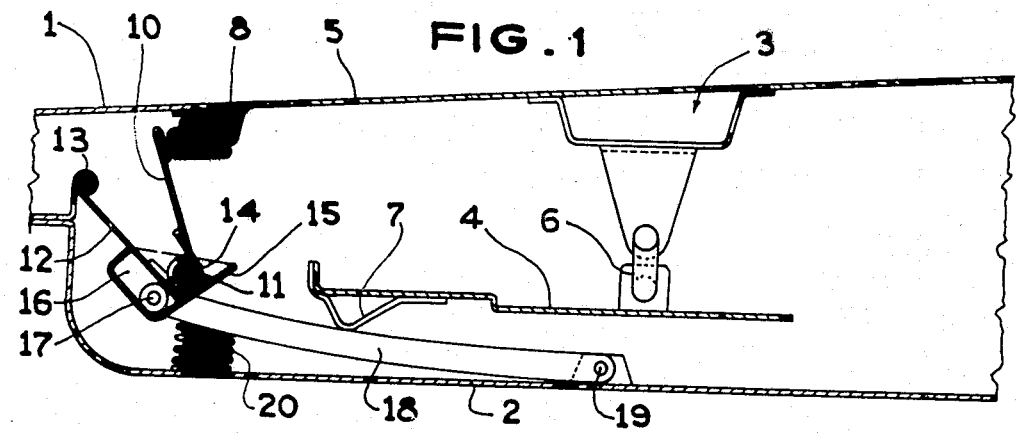
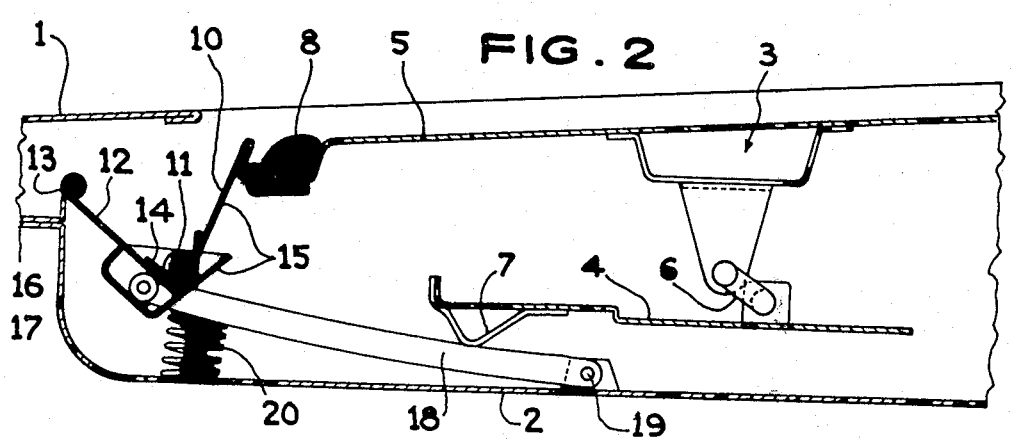
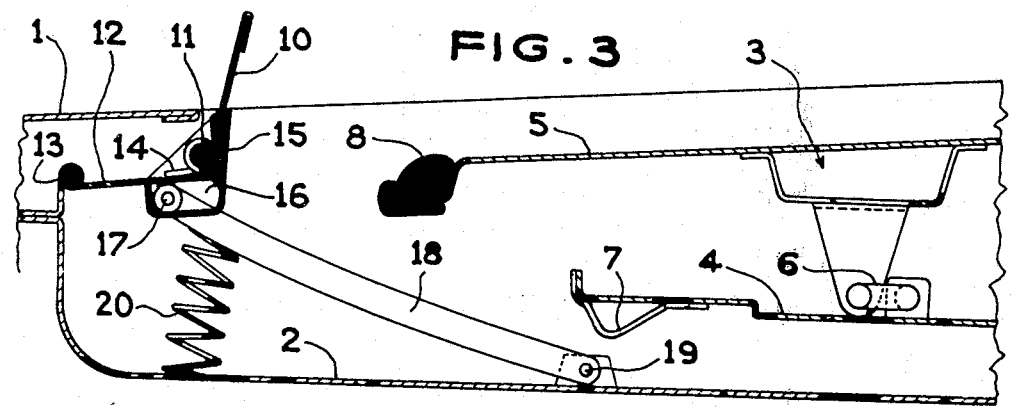

SLIDING ROOF DEVICE WITH A DEFLECTOR

The present invention relates to sliding roofs and in particular those provided with a deflector whose purpose is to deviate the air stream to the rear of the opening when the moving panel of the roof is in a partially or completely open position and thereby avoid turbulence inside the passenger compartment and thus improve the comfort of the driver and passengers of the vehicle.

According to a known conventional arrangement, this deflector is fixed so that it is always projecting from the body of the vehicle, even when the moving panel is in the roof-closing position. Retractable deflectors also exist which are invisible when the panel is in the closing position. In the known devices of this type the deflector is in one piece and is stowed away when the roof is closed in the inner end of the front part of the fixed frame either horizontally or vertically. These two arrangements have a drawback in that the horizontal stowing away results in a useless consumption of space in the opening of the frame whereas the vertical stowing away does not allow a very great height of the deflector when the overall size of the sliding roof is small, which is usually the case.

An object of the invention is to provide a sliding roof device having a deflector in which the deflector extends beyond the roof to such height when the roof is open as to be effective while it occupies only a very small space when the roof is closed. Moreover, this deflector must have sufficient stability in its operative position.

According to the invention there is provided a sliding roof device of the type comprising a frame fixed to the fixed part of the roof, a moving panel movable with respect to the frame, a retractable deflector disposed in the front part of the frame, an actuating lever controlled by the moving panel and acting in opposition to a first return spring to return the deflector to the retracted position when the moving panel is brought to the closing position, wherein the deflector proper is pivoted to a support which is pivoted to the fixed frame and separate from the actuating lever, a second spring being provided which tends to open the angle made between the deflector and its support to an extreme angular position determined by an abutment.

According to other features, the actuating means comprise, on one hand, in the known manner a shoe connected to the moving panel and acting on the lever and, on the other, the front edge of the moving panel which acts on the deflector in opposition to the action of the second spring; the support is pivotably mounted along the front edge of the fixed frame and comprises, in the vicinity of its rear edge: the pivot pin of the deflector, the second spring, the abutment and an opening in which the lever is pivoted.

When the sliding roof is of the type comprising a moving part formed by two panels, namely a lower panel guided in the fixed frame and an upper panel connected to the first panel by links, the lower panel and the upper panel each comprise a bearing or abutment surface adapted to actuate respectively the lever and the deflector when the moving part is moved to its closing position.

The invention and the advantages thereof will be described in more detail hereinafter with reference to the accompanying drawings in which:

FIGS. 1 to 3 are diagrammatic views of the device in three successive positions of operation.

Shown in these Figures is the fixed part 1 of the roof of a vehicle and a fixed frame 2 fixed to the fixed part of the roof and a moving part 3 constituting the openable or sliding roof and constituted by two panels, namely a lower panel 4 slidably mounted in the fixed frame by guide means (not shown) and an upper panel 5 connected to the lower panel by links 6.

The lower panel carries in its front part and on its lower face a shoe 7 whose function will be more specifically explained hereinafter, whereas the upper panel has a sealing bearing 8 fixed along its edge and in particular along its front edge.

This sliding roof device is equipped in accordance with the invention with a deflector comprising a deflector flap 10 pivotably mounted by a pin 11 on a support 12 which is pivotably mounted along the front edge of the fixed frame by a pin 13. A torsion spring 14 is provided around the pin 11 and tends to open the angle made between the deflector 10 and its support 12. An abutment 15 determines the maximum value of this angle or the end-of-travel position of the deflector relative to the support 12.

The support 12 has in its lower part an elongated opening 16 in which a there is received a pin 17 integral with a lever 18 which is pivoted at its other end to the frame by a pivot pin 19. A spring 20 is interposed between the fixed frame and the lever and biases the free end of the lever upwardly.

The device just described operates in the following manner:

When the moving part of the sliding roof occupies its roof-closing position (FIG. 1), the shoe 7 bears against the lever 18, constituting a ramp, and maintains the support 12 and deflector 10 in their lower position. Moreover, the beading 8 of the front edge of the upper panel abuts the free edge of the deflector 10 and maintains this edge in a position close to the support 10 while stressing the spring 14. Thus it is clear that, in this position, the deflector which is retracted in the free space between the frame, the fixed part of the roof of the vehicle and the two panels of the moving part, occupies a particularly small volume.

When the moving panel is shifted rearwardly (FIG. 2), the upper panel 5 moves towards the lower panel 4, the shoe 7 progressively releases the lever 18 which then moves upwardly whereas the front end of the upper panel also progressively releases the free edge of the deflector 10 which moves away from the support 12 under the action of the spring 14.

When the upper panel is in a lower position corresponding to a partial or complete opening of the roof (FIG. 3), the deflector is fully released so that the support 12 occupies an upper position in which the pin 11 is in the vicinity of the edge of the fixed part of the roof whereas the free edge of the deflector 10 has moved still further away from its support and the deflector 10 abuts the flange 15 and occupies a position in which it projects from the fixed part of the roof.

When carrying out the reverse operation for closing the roof, it will be easily understood that the shoe 7, in acting on the lever 18, lowers the support 12 and the deflector 10 and subsequently the sealing beading 8 integral with the upper panel urges, towards the end of the travel, the deflector 10 towards its retracted position. The moving panel therefore acts on two different parts of the device.

The device just described therefore overcomes the drawbacks of known devices and it will be noted that the overall size of the deflector in the retracted position is particularly small whereas in its operative position the deflector projects sufficiently from the fixed part of the roof. This small overall size results from the fact that the deflector and its support fold one against the other in the course of the retracting movement brought about by the closure of the moving panel. It will also be observed that actuation is perfectly automatic and the means employed are sufficiently simple to substantially avoid the danger of jamming or incorrect operation. In addition to these advantages, there are the following two which are also essential:

The deflector is put into the operative position within a short travel of the moving panel in the direction for opening the roof.

The deflector is very stable in its operative position although no part of the actuating device is apparent outside the fixed part of the roof. This results in particular from the fact that the force exerted on the deflector 10 when the vehicle is in motion tends to apply this deflector against the abutment 15. The resulting force on the support 12, which tends to pivot this support in opposition to the action of the spring 20, is very small.

Having now described my invention what I claim as new and desire to secure by Letters Patent is:

1. A sliding roof device for a vehicle, the device comprising a frame for fixing to a fixed part of a roof of the vehicle, a roof part movable with respect to the frame between a roof-closing position and a roof-opening position, a support mounted to be pivotable relative to the frame, a retractable deflector pivotally connected to the support and disposed in a front part of the frame relative to the usual direction of movement of the vehicle, elastically yieldable means for opening the angle made between the interconnected deflector and support, abutment means interposed between the deflector and the support for determining a maximum value of said angle, an actuating lever mounted to be movable relative to the frame and connected to the support to move the support between a first position corresponding to a retracted position of the deflector and a second position corresponding to an operative projecting position of the deflector, second elastically yieldable means for biasing the lever in a direction to put the support in said second position, the lever being cooperative with the movable roof part to be shifted by the second elastically yieldable means to the position of the lever corresponding to said second position of the support when the movable roof part is moved to said roofopening position and to be shifted by the movable roof part to the position of the lever corresponding to said first position of the support when the movable roof part is moved to said roof-closing position, and deflector shifting means combined with the movable roof part to reduce said angle between the deflector and the support when the movable roof part is moved to said roof-closing position.

2. A sliding roof device for a vehicle, the device comprising a frame for fixing to a fixed part of a roof of the vehicle, a roof part movable with respect to the frame between a roof-closing position and a roof-opening position, a support mounted to be pivotable relative to the frame, a retractable deflector pivotally connected to the support and disposed in a front part of the frame relative to the usual direction of movement of the vehicle, elastically yieldable means for opening the angle made between the interconnected deflector and support, abutment means interposed between the deflector and the support for determining a maximum value of said angle, an actuating lever mounted to be movable relative to the frame and connected to the support to move the support between a first position corresponding to a retracted position of the deflector and a second position corresponding to an operative projecting position of the deflector, second elastically yieldable means for biasing the lever in a direction to put the support in said second position, a shoe integral with the movable roof part and cooperative with the lever to shift the lever to the position of the lever corresponding to said first position of the support when the movable roof part is moved to said roof-closing position and to allow the lever to be shifted by the second elastically yieldable means to the position of the lever corresponding to said second position of the support, when the movable roof part is moved to said roof-opening position, the movable roof part having means defining a front edge relative to the normal direction of movement of the vehicle which front edge is capable of engaging and shifting the deflector to reduce said angle in opposition to the action of the first elastically yieldable means when the movable roof part is moved to said roof-closing position.

3. A device as claimed in claim 1, wherein the support is pivotally mounted along a front edge of the fixed frame relative to the normal direction of movement of the vehicle and carries in the vicinity of a free edge of the support the pivotal connection of the deflector, the first elastically yieldable means, the abutment means and means defining an opening in which the lever is pivotally mounted.

4. A device as claimed in claim 1, wherein the movable roof part comprises a lower panel and an upper panel, and the device comprises means for guiding the upper panel in the fixed frame and links connecting the upper panel to the lower panel, the lower panel and the upper panel respectively comprising means for engaging the lever and the deflector in the course of the displacement of the movable roof part to said roof-closing position.

* * * * *